March 25, 1958     O. H. GRISWOLD     2,828,148
BALL AND TUBE TYPE SEAL
Filed June 12, 1953
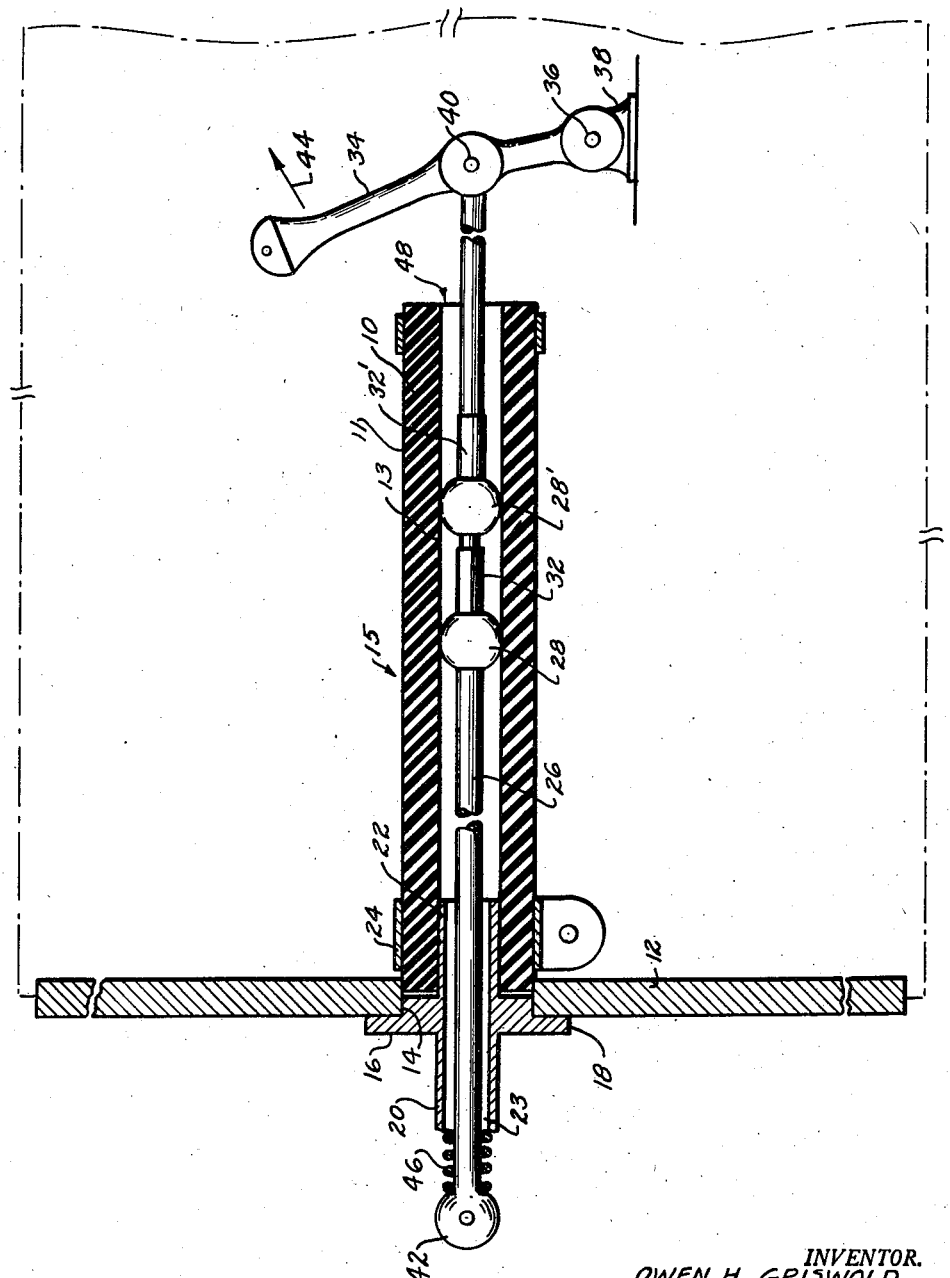
INVENTOR.
OWEN H. GRISWOLD
ATTORNEYS

United States Patent Office 2,828,148
Patented Mar. 25, 1958

2,828,148

BALL AND TUBE TYPE SEAL

Owen H. Griswold, Bergen County, N. J., assignor to the United States of America as represented by the Secretary of the Air Force Application June 12, 1953, Serial No. 361,368

4 Claims. (Cl. 286—16)

This invention relates to seals of the sliding contact type and are applicable where a cable or a rod may be pulled or pushed through an opening in the wall of an enclosure or bulkhead without permitting leakage of fluid or pressure from one side of the wall to the other.

Seals of this character are particularly applicable to aircraft and especially for sealing the leakage space around cables between the cables and the apertures through which the cables must pass.

These seals are particularly adapted to aircraft having pressurized cabins with holes in the cabin wall through which cables are actuated by the pilot's levers or devices for operating remote devices and accessories.

A seal of the general class to which the herein disclosed seal belongs is a necessity where the pressure within the cabin considerably exceeds that of the ambient air.

An object of the invention is to provide a seal which is extremely efficient for the purpose mentioned at a cost which is almost negligible.

I attain this desirable end by providing the device hereinafter described, reference being had to the single figure of the drawing which is a longitudinal axial section through a device made in accordance with my invention.

As shown in the drawing, a length of rubber tubing 10 is provided having an outside diameter 11 of one inch and an inside diameter 13 of seven sixteenths of an inch. It will, however, be understood that these dimensions are tentative and are for illustrative purposes only and may be altered to meet existing conditions, the ratio of the outside diameter to the inside diameter preferably being substantially maintained.

The numeral 12 schematically represents a fragment of the wall of a pressurized cabin, or it may represent a bulkhead, or any similar means upon which the ball and tube assembly 15 may be mounted and where there is a higher pressure on one side of the wall 12 than there is on the other.

A pressure tight fitting 16 comprises a flange 18 which lies against one wall of the pressurized cabin or its equivalent and is secured pressure tight thereto. The pressure tight fitting 16 is shouldered to fit the bore 14 in the wall 12.

Two thin walled hubs or sleeve like extensions 20 and 22 extend oppositely from the fitting 16. The outside diameter of the hub 22 closely fits the inside of the tubing 10 while the outside diameter of the tubing 10 extends slightly into the bore 14.

A hose clamp 24 is drawn tightly around the end of the tubing 10 to retain the same on the tube. A control operating means 26, which may be either a cable or a rod of appropriate size, extends through the tube and out the ends. The bore 23 of the hubs 20 and 22 is considerably larger than the cable 26 or its equivalent rod.

While in the specification and drawing the flange 18 lies against the low pressure side of the wall 12, the fitting 16 may be turned end for end so as to bring the flange 18 on the high pressure side of the wall 12. In such a case, however, the tubing 10 is maintained in concentric relation by the hub 22 only.

Balls 28 and 28' each have a relatively thin walled hub 32 and 32'. These hubs are bored slightly smaller than the outside of the cable or rod 26 and forced over the cable or rod then crimped or swaged on the outside of the rod or cable. If desired, the ends of the hubs 32 and 32' may be welded, soldered or crimped to the cable. Balls 28 and 28' are each several thousandths of an inch larger than the normal inside diameter of the tube 10. The hubs 20 and 22 are bored approximately three thirty seconds of an inch larger than the outside of the operating member 26.

An operating means such as a lever 34, situated in the high pressure area within the cabin, is pivoted at 36 in the bracket 38 which is attached to the aircraft and pivoted at 40 to the cabin end of the shiftable control member 26. The left-hand or outer end of the operating member 26 is provided with some suitable means 42 for attaching extensions for reaching control elements outside of the pressure cabin farther removed, or the attaching means 42 may be omitted and the cable or rod 26 itself extended and attached directly to the accessories which are to be actuated.

When installing the device in the pressurized cabin of an aircraft, the hole 14 is preferably bored in the cabin wall and the pressure tight fitting 16 inserted and secured in place and the hose member or tubing 11 connected on sleeve 22. The hose clamp 24 is then put in place and drawn up tight.

The device may be hooked up variously. The control members 26 may be pulled rightward by moving the lever 34 in the direction of the arrow 44, also a coil spring 46 may be arranged to return the control member 26 to its home position if desired. The hookup or part to be actuated by 42, however, forms no part of the invention and therefore is not described in detail.

From the single figure of the drawing it will be readily apparent that when, for an example, the device is applied to the interior of a pressurized aircraft cabin, the higher pressure air within the cabin will surround the tubing 10 and flow into the opening within the tube at 48 but will be arrested when it reaches the ball 28'. The lower pressure ambient air enters at 23 and is arrested by the ball 28.

Since the area on the outer surface of the tubing 11 upon which the high pressure acts, exceeds the area inside of the tubing upon which the low pressure acts, the result is that the tubing tends to contract the inside diameter 13 thus tightening the bore around the balls 28 and 28' to prevent leakage. Under a differential pressure of 8 p. s. i. and without lubrication, the friction drag between the balls and the interior of the tube was found to be between 1.2 and 4.6 lbs. depending upon direction of movement of the balls' tube interference, and material. Under balanced interior and exterior air pressure conditions without lubrication, the friction drag was found to be between 0.5 to 0.7 lb. A forty-eight hour static test showed a loss of .006 cu. ft. free air per hour with an 8 p. s. i. differential pressure between the interior of the pressurized area and the exterior pressure through 48.

Having described an embodiment of my invention, I claim:

1. In combination, a bulkhead having an opening therethrough, a bulkhead fitting secured pressure tight in said opening having an opening therethrough, a length of flexible rubber hose having one end secured pressure tight on said fitting and having a cylindrical conduit therethrough in communication with the opening through said fitting, an elongated actuator considerably smaller than the diameter of said conduit extending through the interior of said hose and said fitting and freely movable axially through the interior of said hose and said fitting, and a spherical pressure sealing member slightly larger in diameter than the interior of the conduit fixed on said actuator in pressure tight relation to the actuator, said spherical member being several thousandths of an inch larger in diameter than the diameter of the cylindrical conduit through said hose, said spherical member being in axial sealing contact with the hose.

2. In combination with a high pressure area and a low pressure area, a wall separating the said high and low pressure areas, said wall having an opening therethrough between said areas, a cylindrical sleeve fixed at one end to said wall in aligned relation to said opening with its other end projecting into said high pressure area, an elongated flexible rubber tube having one end surrounding said cylindrical sleeve in contact therewith having a major portion of its length projecting away from said other end of said cylindrical sleeve in aligned relation to the axis of said sleeve, said rubber tube having a cylindrical inner surface, an elongated actuator extending through said flexible rubber tube, cylindrical sleeve, and said opening in spaced relation to the interior of said sleeve and the cylindrical inner surface of said rubber tube, a spherical sealing member fixed on said actuator intermediate said other end of said sleeve and the unsecured end of said rubber tube with the periphery of said spherical sealing member disposed in slidable intimate peripheral contact with the cylindrical inner surface of said rubber tube, actuating means for moving said elongated actuator axially within said rubber tube, whereby the differential pressure between the pressure in the high pressure area on the exterior of said rubber tube and the low pressure from the low pressure area on the interior of the rubber tube holds the rubber tube contracted in sealing relation with the periphery of the spherical member to prevent pressure leakage through said rubber tube from said high pressure area to said low pressure area.

3. In a differential pressure seal for an aircraft bulkhead having an opening therethrough between an area of higher pressure and an area of relative lower ambient pressure, a flexible resilient compressible hose having one end adapted to be secured to said wall in pressure tight relation to said wall in axial communicating alignment with said opening and formed with a smooth cylindrical bore, an elongated cable type actuator extending through the opening and the said smooth cylindrical bore in inwardly spaced relation to said bore and freely movable axially therein, and a relatively non-compressible ball pressure seal and guide member slightly larger in diameter than the diameter of said smooth cylindrical bore fixed on said cable type actuator in pressure tight relation with said smooth cylindrical bore between the opposite ends of the hose for sealing the space between the cable type actuator and the cylindrical bore, whereby application of greater differential pressure from said area of higher pressure on the exterior surface of the hose relative to the lesser differential pressure from the area of relatively lower pressure in communication with the interior of the hose through the said opening in said bulkhead tends to compress the flexible hose to contract the smooth cylindrical bore in tighter sealing contact with the peripheral contacting surface of the ball.

4. In a ball and tube type pressure seal for sealing an opening in a wall between a pressurized area at one side and a lower differential pressure area at the other side in communication with the first pressure area through said opening, said pressure seal comprising a fitting adapted to be secured over said opening with a cylindrical bore therethrough in alignment with said opening, a flexible, compressible, resilient, elongated tube member secured on the fitting at one end and extending into the said pressurized area and subject to the higher differential pressure exteriorly of the tube member and to the lower differential pressure interiorly thereof originating from its other end through the said opening end bore, said tube member having a smooth cylindrical bore, and an elongated flexible actuator extending centrally through the tube member in spaced relation to the smooth cylindrical bore and shiftable axially to communicate motion longitudinally through said smooth cylindrical bore between the differential pressure areas, an enlarged spherical guide member and pressure seal surrounding the elongated flexible actuator and fixed thereto in pressure sealed relation with its outer surface in peripheral sealing contact with the smooth cylindrical bore of said resilient tube member intermediate the ends of the tube member, said spherical guide member having a diameter at least two thousandths of an inch greater in diameter than the normal internal diameter of the smooth cylindrical bore of the tube member whereby the enlarged spherical guide member and pressure seal supports the flexible actuator in predetermined spaced relation to the bore of the tube and a greater differential pressure on the exterior of the tube member tends to contract the smooth cylindrical bore into increased sealing contact with the outer peripheral surface of the said spherical guide member and pressure seal.

References Cited in the file of this patent

UNITED STATES PATENTS

| | | |
|---|---|---|
| 328,579 | Fisher | Oct. 20, 1885 |
| 1,287,285 | Gammeter | Dec. 10, 1918 |
| 1,467,877 | Rea | Sept. 11, 1923 |
| 1,939,766 | Corset | Dec. 19, 1933 |
| 2,390,928 | Del Mar | Dec. 11, 1945 |
| 2,517,717 | Rose | Aug. 8, 1950 |
| 2,592,949 | Philipson | Apr. 15, 1952 |
| 2,647,774 | Newberry | Aug. 4, 1953 |
| 2,717,792 | Pelley | Sept. 13, 1955 |

FOREIGN PATENTS

| | | |
|---|---|---|
| 1,012,847 | France | Apr. 23, 1952 |